United States Patent
Zou et al.

(10) Patent No.: US 12,230,991 B2
(45) Date of Patent: Feb. 18, 2025

(54) CHARGING DEVICE

(71) Applicant: RoyPow Technology Co., Ltd., Guangdong (CN)

(72) Inventors: Quanfu Zou, Huizhou (CN); Fangzheng Kou, Huizhou (CN)

(73) Assignee: RoyPow Technology Co., Ltd., Huizhou (CN)

(*) Notice: Subject to any disclaimer, the term of this patent is extended or adjusted under 35 U.S.C. 154(b) by 463 days.

(21) Appl. No.: 17/728,711

(22) Filed: Apr. 25, 2022

(65) Prior Publication Data

US 2023/0103028 A1 Mar. 30, 2023

(30) Foreign Application Priority Data

Sep. 30, 2021 (CN) ............. 202111166165.2

(51) Int. Cl.
*H02J 7/00* (2006.01)
*H02J 7/02* (2016.01)
*H02M 3/335* (2006.01)
*H02M 3/00* (2006.01)

(52) U.S. Cl.
CPC .......... *H02J 7/007* (2013.01); *H02J 7/00304* (2020.01); *H02J 7/02* (2013.01); *H02M 3/33576* (2013.01); *H02J 2207/20* (2020.01); *H02M 3/01* (2021.05)

(58) Field of Classification Search
CPC .......... H02J 7/007; H02J 7/00304; H02J 7/02; H02J 2207/20; H02M 3/33576; H02M 3/01
USPC ............. 320/107, 108, 157, 158, 163, 166
See application file for complete search history.

(56) References Cited

U.S. PATENT DOCUMENTS

| | | | |
|---|---|---|---|
| 10,938,228 B2* | 3/2021 | Zhang | H02J 7/00 |
| 12,101,031 B2* | 9/2024 | Choi | H02M 3/33569 |
| 2016/0006356 A1* | 1/2016 | Nirantare | H02J 7/00712 |
| | | | 363/21.02 |

(Continued)

FOREIGN PATENT DOCUMENTS

| | | |
|---|---|---|
| CN | 2657288 | 11/2004 |
| CN | 101963949 B | 9/2012 |

(Continued)

OTHER PUBLICATIONS

China National Intellectual Property Administration: Office Action of CN Application No. 202111166165.2 (related application); Jul. 7, 2022; 8 pages.

*Primary Examiner* — Edward Tso
*Assistant Examiner* — Aaron Piggush

(57) ABSTRACT

The present disclosure relates to a charging device. By providing a charge-enabled pin and an engage-enabled pin with different lengths in the charging interface of the charging device, the engage-enabled pin is firstly in contact with a battery when charging. At this time, a charging management circuit controls an LLC half-bridge resonant power supply to soft start. A third end of the charging management circuit outputs a signal to drive a first switch to be turned on, and the output end of the LLC half-bridge resonant power supply charges the battery, and charging soft start and zero-voltage connection are achieved. During the unplugging process, the charge-enabled pin is firstly removed from the battery, and zero-current disconnection can be achieved when unplugging the other pins of the charging interface.

10 Claims, 9 Drawing Sheets

(56) References Cited

U.S. PATENT DOCUMENTS

2016/0118782 A1\* 4/2016 Zhang .................... H02M 1/36
                                                361/2
2023/0026817 A1\* 1/2023 Choi ................ H02M 3/33573

FOREIGN PATENT DOCUMENTS

| CN | 203313048 U | 11/2013 |
| CN | 205753505 U | 11/2016 |
| CN | 110543225 A | 12/2019 |

\* cited by examiner

CHARGING DEVICE

CROSS-REFERENCE TO RELATED APPLICATIONS

This application claims priority to and/or benefit of Chinese No. 2021111661652, filed Sep. 30, 2021, entitled CHARGING DEVICE, the specification of which is incorporated by reference herein in its entirety.

TECHNICAL FIELD

The present disclosure relates to a field of charging management technology, and particularly to a charging device.

BACKGROUND

At present, when a charging device is connected to a battery by using a connector, a differential voltage loop exists between the connector and the battery, which causes arc oxidation of a terminal contact.

When the charging device charges the battery with a large current, an area of the contact gradually decreases when the connector is gradually disconnected from the battery, so that an arc is generated at the moment of disconnection, thereby oxidizing a metal part of the terminal contact. An increase in resistance value of the contact surface for a long time leads to heat generation of the terminal contact, which will easily cause fire and irreparable losses.

SUMMARY

In view of the above, it is necessary to provide a charging device, which avoids the terminal oxidation problem caused by the arc generated when the charging device is plugged in and unplugged, so as to improve safety and the service life of the charging device.

A charging device provided by the embodiments of the present disclosure, includes:
  an LLC half-bridge resonant power supply; an input end of the LLC half-bridge resonant power supply is configured to be connected to a power supply, an output end of the LLC half-bridge resonant power supply is connected to an input end of a first switch in the normally open state, and an output end of the first switch is configured to be connected to a battery to be charged;
  a charging interface, configured to be connected to the battery to be charged, and provided with an engage-enabled pin and a charge-enabled pin; the length of the charge-enabled pin is smaller than the length of a communication-enabled pin and the engage-enabled pin, respectively;
  a charging management circuit; a first end of the charging management circuit is connected to an end of the engage-enabled pin, a second end of the charging management circuit is connected to an end of the charge-enabled pin, and a third end of the charging management circuit is connected to a controlled end of the first switch;
  the charging management circuit is configured to control the LLC half-bridge resonant power supply to soft start when the battery to be charged is in contact with the engage-enabled pin during a process of plugging the charging interface into the battery to be charged; the charging management circuit is further configured to control the first switch to be turned on when another end of the charge-enabled pin of the charging interface is in contact with the battery to be charged to cause the LLC half-bridge resonant power supply to charge the battery to be charged; and
  the charging management circuit is configured to control a primary side of the LLC half-bridge resonant power supply to stop operating when the charge-enabled pin is disconnected from the battery to be charged during a process of unplugging the charging interface from the battery to be charged.

In an embodiment, the LLC half-bridge resonant power supply includes:
  a resonant half-bridge control circuit; an input end of the resonant half-bridge control circuit is configured to be connected to the power supply;
  a primary side resonant circuit; an input end of the primary side resonant circuit is configured to be connected to the power supply, and a controlled end of the primary side resonant circuit is connected to a control end of the resonant half-bridge control circuit;
  a secondary side rectifier circuit; an input end of the secondary side rectifier circuit is coupled to the primary side resonant circuit, an output end of the secondary side rectifier circuit is connected to the input end of the first switch;
  an output control circuit; a controlled end of the output control circuit is connected to the third end of the charging management circuit, and a control end of the output control circuit is connected to a control end of the first switch; and
  a charging output circuit; an end of the charging output circuit is connected to the output end of the first switch, and another end of the charging output circuit is configured to be connected to the battery to be charged.

In an embodiment, the charging device further includes:
  a first optical coupler; a light emitter of the first optical coupler is connected to the fourth end of the charging management circuit, and a light receiver of the first optical coupler is connected to the burst mode operation threshold setting end of the resonant half-bridge control circuit;
  the charging management circuit is configured to, during the process of unplugging the charging interface from the battery to be charged, when the charge-enabled pin is disconnected from (i.e., is not in contact with) the battery to be charged, output a signal from the fourth end of the charging management circuit to make the light emitter operate, causing the light receiver of the first optical coupler to pull potential at the burst mode operation threshold setting end to a low level when receiving a light signal emitted by the light emitter; and
  when the burst mode operation threshold setting end is at a low level, the resonant half-bridge control circuit enters an idle state to cause the primary side resonant circuit to stop operating.

In an embodiment, the resonant half-bridge control circuit is an HR1000 model controller.

In an embodiment, the charging device further includes:
  a voltage follower circuit; an input end of the voltage follower circuit is connected to the fourth end of the charging management circuit, and the potential at an output end of the voltage follower circuit is the same as the potential to which the input end of the voltage follower circuit is applied; and
  a feedback amplifier circuit; an input end of the feedback amplifier circuit is connected to the input end of the voltage follower circuit, and an output end of the feedback amplifier circuit is connected to light emitter of the first optical coupler.

In an embodiment, the first switch is a relay, and the output control circuit includes:
a first transistor; a base of the first transistor is connected to the third end of the charging management circuit, an emitter of the first transistor is grounded, and a collector of the first transistor is connected to a coil of the first switch;
the third end of the charging management circuit outputs high level to trigger the first transistor to be turned on when the other end of the charge-enabled pin of the charging interface is in contact with the battery to be charged;
the collector of the first transistor triggers the coil to cause the first switch to be turned on, and the LLC half-bridge resonant power supply charges the battery to be charged.

In an embodiment, the charging output circuit includes:
a first filter circuit; an input end of the first filter circuit is connected to the output end of the first switch; and
a fuse protection circuit; an input end of the fuse protection circuit is connected to an output end of the first filter circuit, and an output end of the fuse protection circuit is configured to be connected to the battery to be charged.

In an embodiment, the charging device further includes:
a power factor correction power supply; an input end of the power factor correction power supply is configured to be connected to the power supply, and an output end of the power factor correction power supply is connected to the input end of the resonant half-bridge control circuit and the input end of the primary side resonant circuit.

In an embodiment, the charging device further includes:
an input rectification filter circuit, connected in series between the power supply and the power factor correction power supply.

In an embodiment, the charging device further includes:
a logic device power supply conversion circuit; an input end of the logic device power supply conversion circuit is configured to be connected to the output end of the power factor correction power supply; and an output end of the logic device power supply conversion circuit is connected to the LLC half-bridge resonant power supply and the charging management circuit, respectively, and configured to convert the output voltage of the power factor correction power supply to an operating voltage applicable for the LLC half-bridge resonant power supply and the charging management circuit.

The charging device provided by the embodiments of the present disclosure at least has the following beneficial effects. By providing a charge-enabled pin and an engage-enabled pin with different lengths in the charging interface of the charging device and using the charging management ability of the charging management circuit in the charging device, the first end of the charging management circuit is connected to an end of the engage-enabled pin, the second end of the charging management circuit is connected to an end of the charge-enabled pin, and the third end of the charging management circuit is connected to the controlled end of the first switch. When charging, since the charge-enabled pin is the shortest, the engage-enabled pin is firstly in contact with the battery. When the battery is in contact with the engage-enabled pin, the electrical signal received by the first end of the charging management circuit connected to the other end of the engage-enabled pin is changed. When the charging management circuit detects the change, it controls the LLC half-bridge resonant power supply to soft start. During the soft start process of the LLC half-bridge resonant power supply, the charge-enabled pin contacts the battery later. The electrical signal received by the second end of the charging management circuit connected to the other end of the charge-enabled pin is changed under the effect of the battery. The charging management circuit detects the change, and the third end thereof outputs a signal, which applies to the controlled end of the first switch, to drive the first switch to be turned on. At this time, the output end of the LLC half-bridge resonant power supply charges the battery to be charged to achieve a charging soft start and zero-voltage connection.

When the charging process is completed, since the charge-enabled pin is the shortest, the charge-enabled pin is firstly removed from the battery to be charged during the process of unplugging the charging interface. At this time, the charging management circuit can detect the disconnection of the charge-enabled pin from the battery by the change of the signal received by the second end. At this time, the fourth end of the charging management circuit outputs a signal to the burst mode operation threshold setting end of the LLC half-bridge resonant power supply to trigger the primary side of the LLC half-bridge resonant power supply to stop operating. At this time, the engage-enabled pin is further disconnected from the battery. Since the primary side of the LLC half-bridge resonant power supply has stopped operating at this time, zero-current disconnection is achieved, thereby avoiding the oxidation problem of the contact surface caused by the arc generated during the hot plugging process, and improving the service life and safety of the charging device.

BRIEF DESCRIPTION OF THE DRAWINGS

To illustrate the technical solution in the embodiments of the present disclosure or related art more clearly, the accompanying drawings for describing the embodiments or the prior art are introduced briefly in the following. Apparently, the accompanying drawings in the following description only represent some embodiments of the present disclosure, and persons of ordinary skill in the art can derive other drawings from the accompanying drawings without creative efforts.

DETAILED DESCRIPTION

Figure 1:
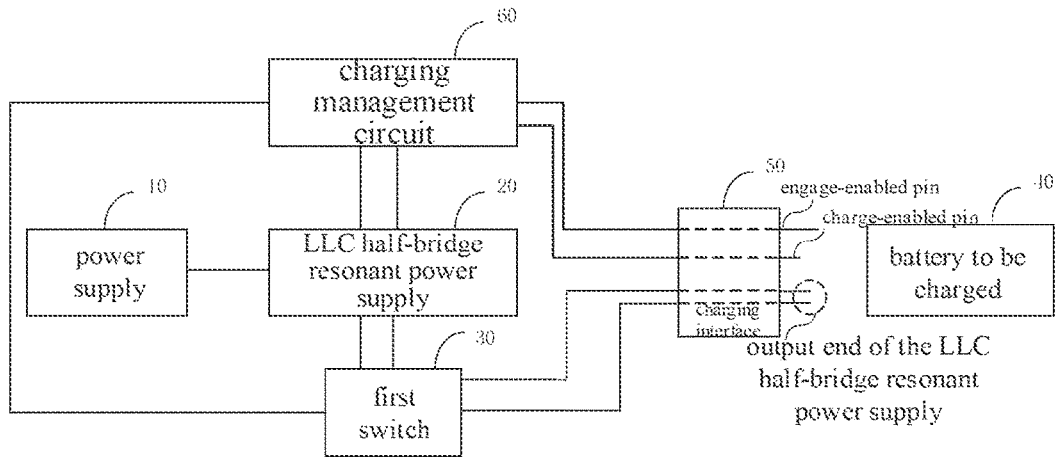
FIG. 1 is a schematic diagram of a circuit structure of a charging device according to an embodiment.

In order to facilitate the understanding of the present disclosure, a more comprehensive description of the present disclosure will be made with reference to the relevant drawings in the followings. The embodiments of the present disclosure are shown in the drawings. However, the present disclosure can be implemented in many different forms, and is not limited to the embodiments described herein. On the contrary, the purpose of providing these examples is to make the disclosure more thorough and comprehensive.

Unless otherwise specified, all the technical and scientific terms used herein have the same meaning as commonly understood by those skilled in the technical field of the present disclosure. The terminology used in the specification of the present disclosure herein is only for the purpose of describing specific embodiments, and is not intended to limit the present disclosure.

It can be understood that the terms "first", "second" and the like used in the present disclosure can be used herein to describe various elements, and these elements are not limited by these terms. These terms are only used to distinguish the first element from another element. For example, without departing from the scope of the present disclosure, a first resistance may be referred to as a second resistance, and similarly, the second resistance may be referred to as the first resistance. Both the first resistor and the second resistor are resistors, but they are not the same resistor.

It can be understood that the "connection" in the following embodiments should be understood as "electrical connection", "communication connection", etc. if the connected circuit, module, unit and the like has the transmission of electrical signal or data between each other.

The singular forms of "a", "an", and "the" can also include plural forms when they are used herein, unless otherwise specified clearly in the context. It should be also be understood that the terms "include/comprise" or "have/has" and the like specify the existence of the stated features, wholes, steps, operations, components, parts or their combinations, but do not exclude the possibility of the existence or addition of one or more other features, wholes, steps, operations, components, parts or their combinations.

To address the problems specified in the background, in an embodiment, a charging device is provided. As shown in FIG. 1, the charging device includes an LLC half-bridge resonant power supply 20, a charging interface 50, and a charging management circuit 60. An input end of the LLC half-bridge resonant power supply 20 is configured to be connected to a power supply 10, which can be a mains supply. An output end of the LLC half-bridge resonant power supply 20 is connected to an input end of a first switch 30 in the normally open state, and an output end of the first switch 30 is configured to be connected to a battery 40 to be charged. The charging interface 50 is configured to be connected to the battery 40 to be charged, and the charging interface 50 is provided with an engage-enabled pin and a charge-enabled pin. The length of the charge-enabled pin is smaller than the length of a communication-enabled pin and the engage-enabled pin, respectively. For the charging interface 50, it can be a rectangular interface including multiple rows of pins or an oval interface including multiple rows of pins, etc., and its shape can be specifically designed to match the interface of the battery 40 to be charged which is adapted to the charging interface 50.

In addition, a first end of the above charging management circuit 60 is connected to an end of the engage-enabled pin, a second end of the charging management circuit 60 is connected to an end of the charge-enabled pin, and a third end of the charging management circuit is connected to a controlled end of the first switch 30.

Since the length of the charge-enabled pin is relatively short, during the process of plugging the charging interface 50 into the battery 40 to be charged, the charging management circuit 60 can firstly control the LLC half-bridge resonant power supply 20 to soft start when the battery 40 to be charged is in contact with the engage-enabled pin. At this time, the battery has not been charged yet. When the other end of the charge-enabled pin of the charging interface 50 is further in contact with the battery 40 to be charged, the charging management circuit 60 controls the first switch to be turned on, so that the LLC half-bridge resonant power supply 20 charges the battery 40 to be charged so as to achieve zero-voltage connection and soft start charging. In addition, during the process of unplugging the charging interface 50 from the battery 40 to be charged, the charging management circuit 60 controls the primary side of the LLC half-bridge resonant power supply 20 to stop operating when the charge-enabled pin is disconnected from the battery 40 to be charged (i.e., the charge-enabled pin is not in contact with the battery 40 to be charged). At this time, no current is output to the battery 40 to be charged. At this time, the engage-enabled pin of the charging interface 50 is further unplugged and the circuit connection between the LLC half-bridge resonant power supply 20 and the battery is disconnected to achieve zero-current disconnection, thereby avoiding arc oxidation of the contact caused by the differential voltage loop between the connector and the battery during plugging and unplugging process when charging, so as to improve the service life, safety, and product reliability of the charging device. An output pin of the LLC half-bridge resonant power supply 20 can be fixed and integrated in the charging interface 50, and the length of the output pin of the LLC half-bridge resonant power supply 20 is also less than the length of the charge-enabled pin in the charging interface 50.

Figure 2:
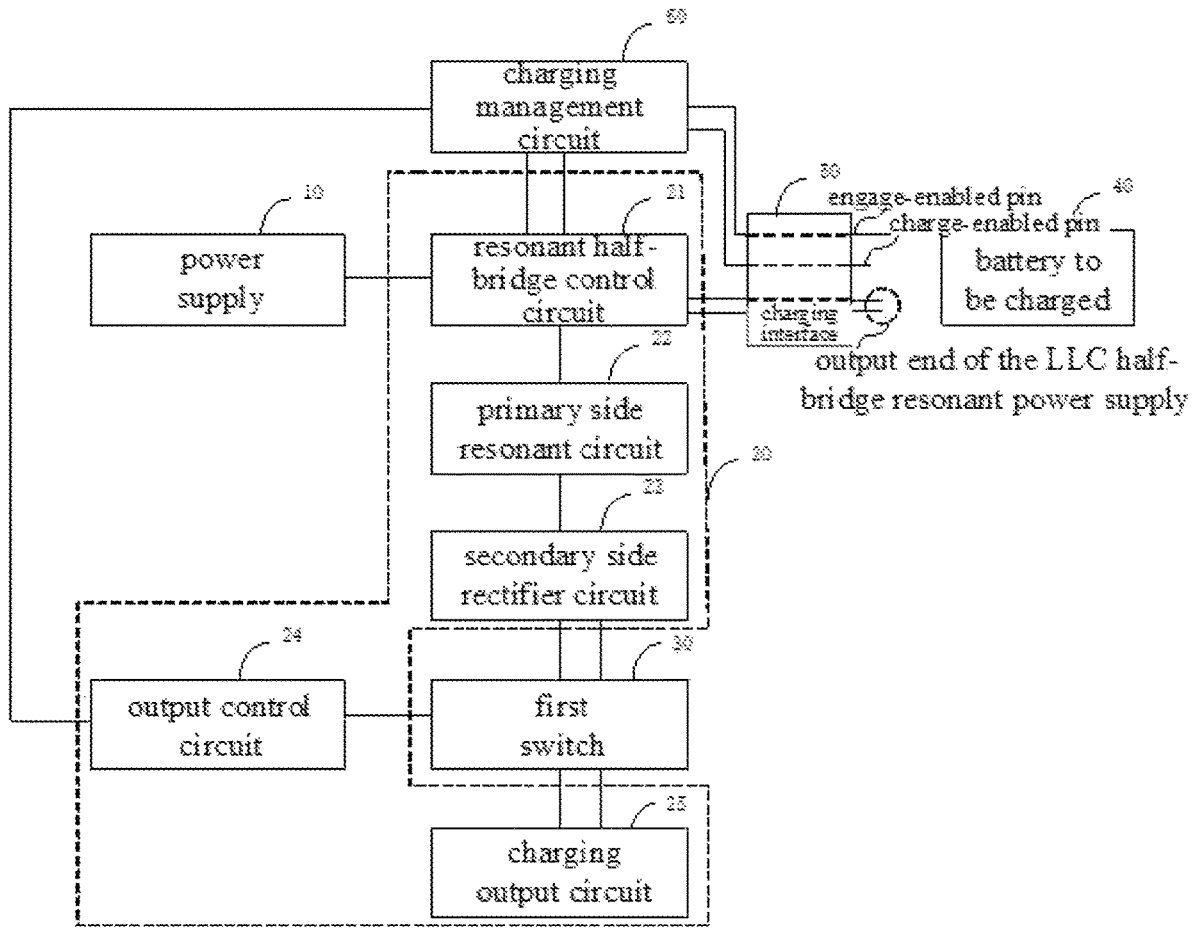
FIG. 2 is a schematic diagram of a circuit structure of a charging device according to an embodiment.
Figure 3:
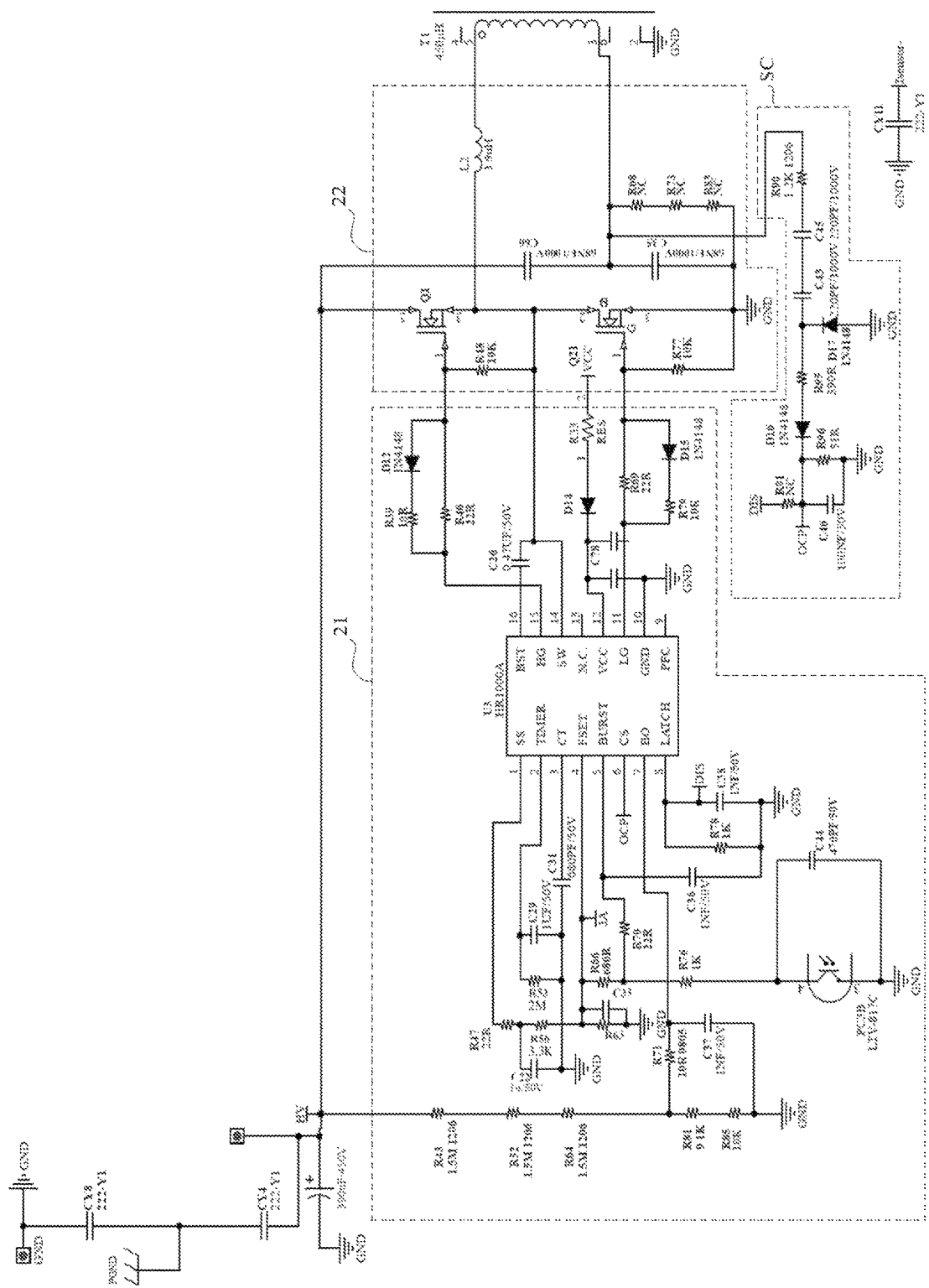
FIG. 3 is a circuit diagram of a primary side of an LLC half-bridge resonant power supply in FIG. 1.
Figure 4:
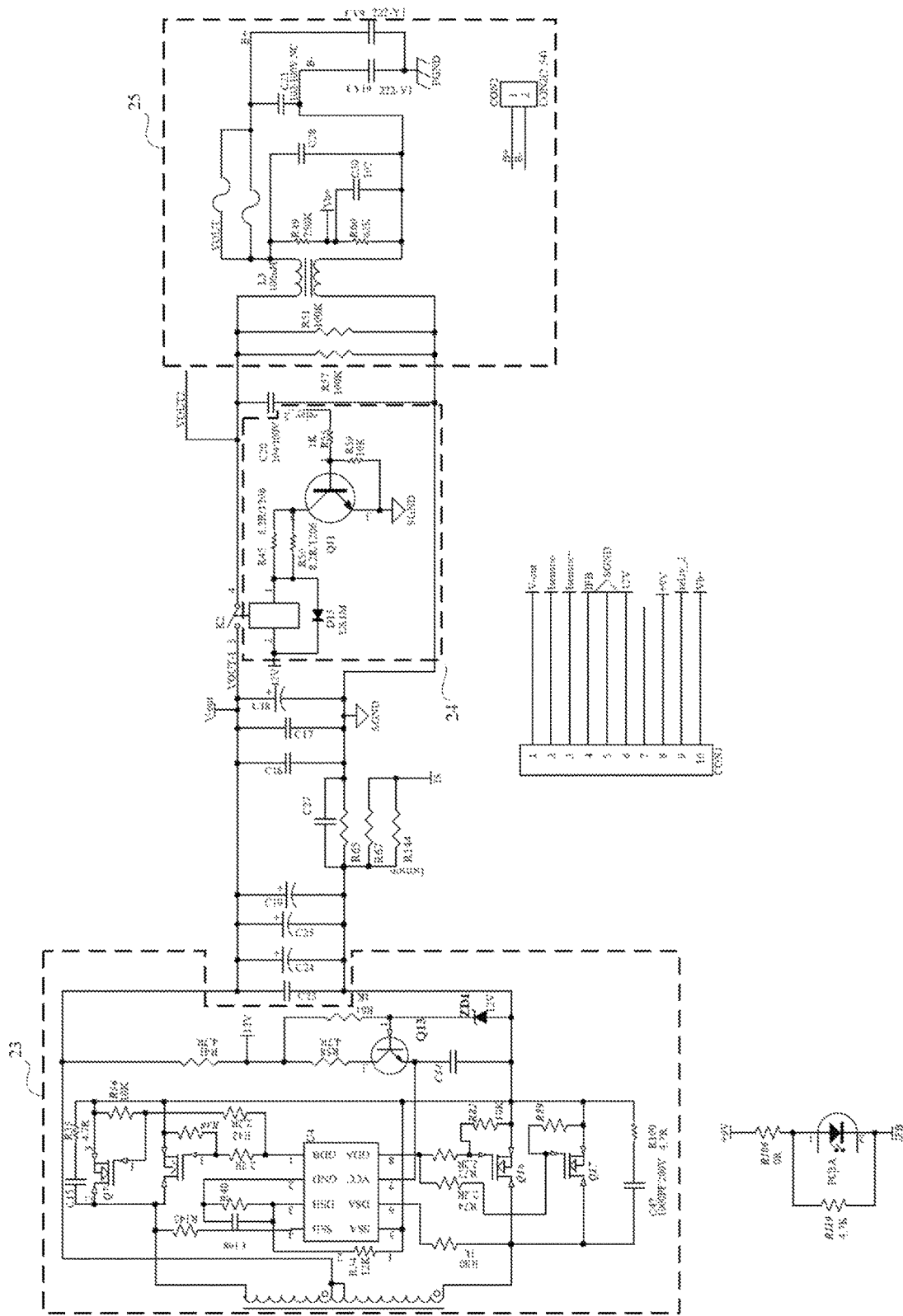
FIG. 4 is a circuit diagram of a secondary side of the LLC half-bridge resonant power supply in FIG. 1.

In an embodiment, as shown in FIGS. 2 to 4, the LLC half-bridge resonant power supply 20 includes: a resonant half-bridge control circuit 21, a primary side resonant circuit 22, a secondary side rectifier circuit 23, an output control circuit 24, and a charging output circuit 25. An input end of the resonant half-bridge control circuit 21 is configured to be connected to the power supply 10. An input end of the primary side resonant circuit 22 is configured to be connected to the power supply 10. A controlled end of the primary side resonant circuit 22 is connected to a control end of the resonant half-bridge control circuit 21. An input end of the secondary side rectifier circuit 23 is coupled to the primary side resonant circuit 22. An output end of the secondary side rectifier circuit 23 is connected to the input end of the first switch 30. A controlled end of the output control circuit 24 is connected to the third end of the charging management circuit 60. A control end of the output control circuit 24 is connected to a control end of the first switch 30. An end of the charging output circuit 25 is connected to the output end of the first switch 30, and another end of the charging output circuit 25 is configured to be connected to the battery 40 to be charged.

When the charging interface 50 and the output end of the LLC half-bridge resonant power supply 20 are connected with the battery 40 to be charged, the output end of the LLC half-bridge resonant power supply 20 can be integrated in the charging interface 50, and the length of the charge-enabled pin is kept shortest compared to the lengths of other pins in the charging interface 50. The charging management circuit 60 controls the resonant half-bridge control circuit 21 to operate when the engage-enabled pin is in contact with the battery. The on/off of a transistor in the primary side resonant circuit 22 is controlled by the resonant half-bridge control circuit 21. The secondary side rectifier circuit 23 is coupled to the primary side resonant circuit 22, and rectifies the voltage coupled by the secondary side to generate a DC power suitable for charging the battery. The DC power generated is transmitted to the output circuit 25 after passing through the first switch 30. Since the charge-enabled pin has not yet contacted the battery at the beginning, the first switch 30 is in an off state. At this time, only the resonant half-bridge control circuit 21 performs the voltage conversion of the primary side resonant circuit 22 and the secondary side rectifier circuit 23 in the soft start mode, and when the charging interface 50 is plugged in tightly, the change of the signal received by the charge-enabled pin triggers the third end of the charging management circuit 60 to output a signal to the output control circuit 24, so that the output control circuit 24 drives the first switch 30 to be turned on. At this time, the DC power generated by the secondary side rectifier circuit 23 is transmitted to the output circuit 25 through the first switch 30, and the battery is charged through the output circuit 25.

In an embodiment, in order to improve the stability of the electrical signal output to the battery, a filter circuit is also connected in series to the output end of the secondary side rectifier circuit 23. For example, it can be a filter circuit composed of C23, C24, C25, and C26 as shown in FIG. 4. The output electrical signal of the secondary side rectifier circuit 23 is transmitted to an input end 5 of the first switch 30K2 after the output electrical signal is filtered, and then transmitted to an input end of the output circuit 25 through an output end 4 of the first switch 30K2. Positive and negative voltage signals (B+ and B−) are output at the output circuit 25, and B+ and B− can be connected to the battery 40 to be charged through a port CON2, as shown in FIGS. 1 and 2. The port CON2 can be integrated in the charging interface 50, which is convenient for the plugging and unplugging process when charging.

In an embodiment, the charging device further includes a first optical coupler, and a light emitter of the first optical coupler is connected to a fourth end of the charging management circuit 60. A light receiver of the first optical coupler is connected to a burst mode operation threshold setting end of the resonant half-bridge control circuit 21, respectively. During the process of unplugging the charging interface 50 from the battery 40 to be charged, the charging management circuit 60 is configured to, when the charge-enabled pin is disconnected from the battery 40 to be charged, the fourth end of the charging management circuit 60 outputs a signal to be applied to the light emitter, so as to cause the light emitter to operate, so that the burst mode operation threshold setting end is pulled to a low level by the light receiver of the first optical coupler when receiving the light signal emitted by the light emitter. When the burst mode operation threshold setting end is at a low level, the resonant half-bridge control circuit 21 enters an idle state to cause the primary side resonant circuit 22 to stop operating.

Figure 5:
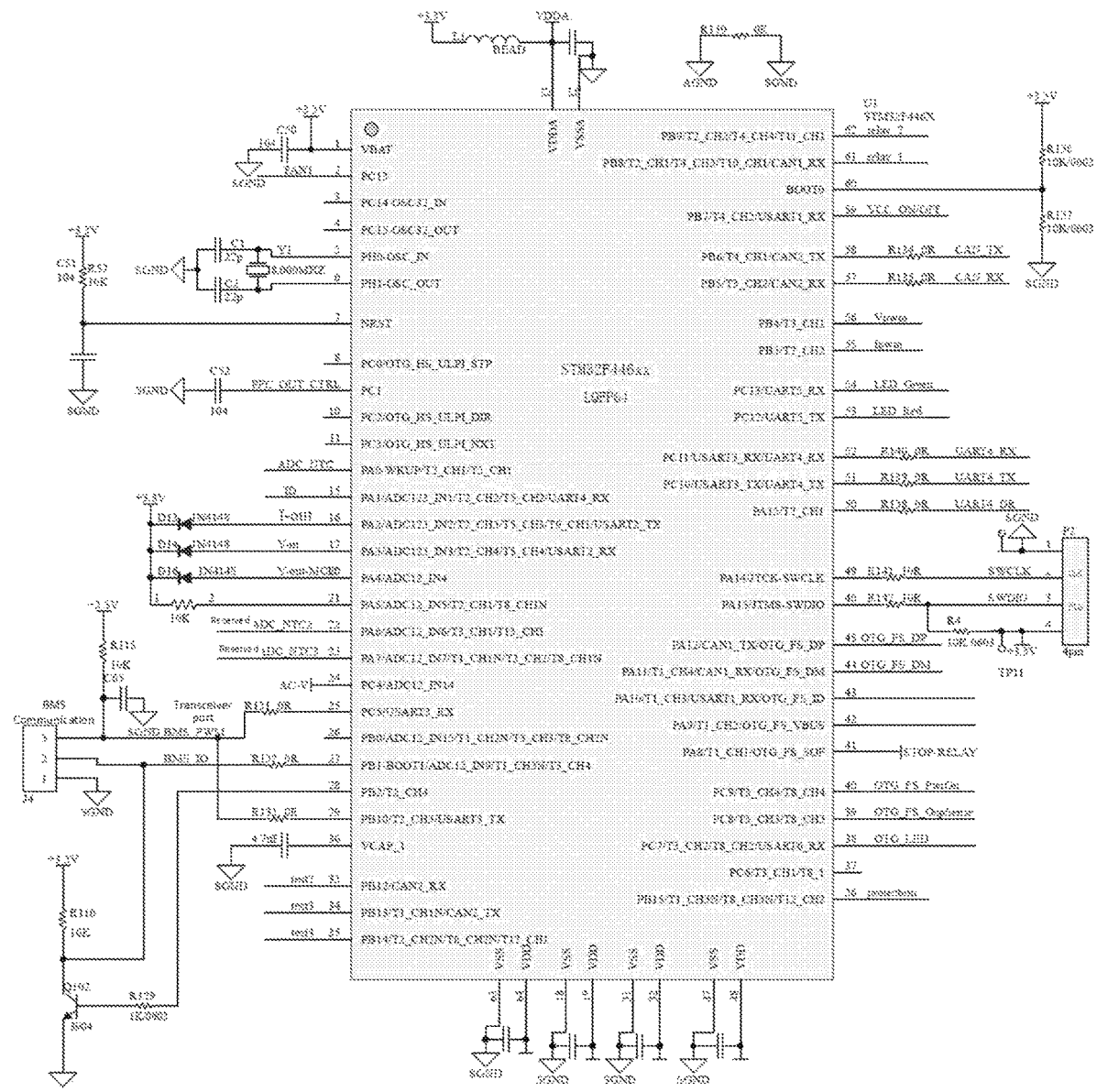
FIG. 5 is a circuit diagram of a charging management circuit according to an embodiment.

Based on the above direct or indirect relationship between the first optical coupler connected to the burst mode operation threshold setting end BURST of the resonant half-bridge control circuit 21 and the fourth end of the charging management circuit 60, the charge-enabled pin is firstly disconnected from the battery 40 to be charged due to its short length during the process of unplugging the charging interface 50 from the battery 40 to be charged when the charging is completed, and in the charging management circuit 60, the signal received by the second end connected to the charge-enabled pin jumps from a low level to a high level. At this time, the fourth end (which can be a Vpwm signal output by the pin 56 of the STM32 chip as shown in FIG. 5) of the charging management circuit 60 outputs a low level, which directly or indirectly applies to the cathode of the light emitter of the first optical coupler, to cause the light emitter of the first optical coupler to operate. After the light receiver of the first optical coupler receives the light signal emitted by the light emitter, the current flowing through the light receiver is changed, and the potential of the BURST end connected to an end of the light receiver is pulled to a low level (for example, the low level here may refer to that the potential to which the pin BURST is applied is lower than 1.25V), so as to turn off the driving operation of the resonant half-bridge control circuit 21, so that the resonant half-bridge control circuit 21 enters an idle state, and the primary side resonant circuit 22 stops operating.

In an embodiment, the resonant half-bridge control circuit 21 is an HR1000 model controller. Specifically, it can also be an HR1000A model controller. When the resonant half-bridge control circuit 21 of such model is selected, as shown in FIG. 3, its pin FSET is grounded through a resistor R66 and a resistor R76, and the lowest frequency of an oscillator is determined by the resistance of the resistor connected in series with the ground. The switching frequency of the resonant half-bridge control circuit 21 can be configured by connecting the first optical coupler and closing a feedback loop. The high and low configuration of the switching frequency achieves the output voltage regulation of the primary side resonant circuit 22. The pin FSET is also configured to be connected to a filter circuit composed of R63 and C33, which can ensure that excessive surge energy is prevented during startup and a soft start is achieved.

As shown in FIG. 3, the burst mode operation threshold setting end BURST of the resonant half-bridge control circuit 21 is connected to the resistor R66 connected to the pin FSET through the resistor R70, and the pin BURST is also connected in series with a capacitor C36 and then grounded. A pin LATCH of the resonant half-bridge control circuit 21 is connected to a latch trigger circuit SC connected to the primary side resonant circuit 22, for example, the latch trigger circuit SC may include a resistor R90, a resistor R91, a resistor R95, a resistor R96, a capacitor C43, a capacitor C45, a capacitor C46, a diode D16, and a diode D17 as shown in FIG. 3. An input end of the latch trigger circuit SC (an end of R90) is connected to the output end of the primary side resonant circuit 22. The voltage output from the output end of the primary side resonant circuit 22 is fed back to the pin LATCH of the resonant half-bridge control circuit 21. When an output voltage of an output pin DIS of the latch trigger circuit SC exceeds a pre-stored threshold value, the resonant half-bridge control circuit 21 is latched. For example, when the voltage received by the pin LATCH is greater than 1.85V, the resonant half-bridge control circuit 21 is turned off.

In an embodiment, the charging device further includes a voltage follower circuit and a feedback amplifier circuit. An input end of the voltage follower circuit is connected to the fourth end of the charging management circuit 60, and the potential at an output end of the voltage follower circuit is the same as the potential to which the input end is applied. An input end of the feedback amplifier circuit is connected to the input end of the voltage follower circuit, and an output end of the feedback amplifier circuit is connected to light emitter of the first optical coupler.

Figure 6:
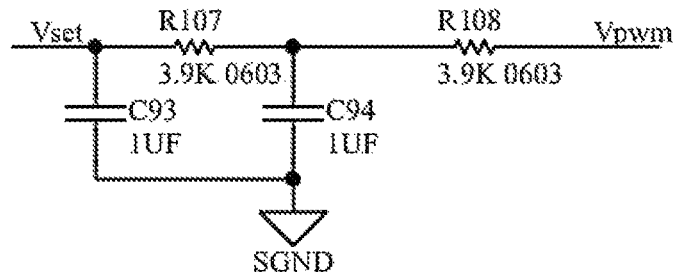
FIG. 6 is a circuit diagram of a voltage follower circuit according to an embodiment.
Figure 7:
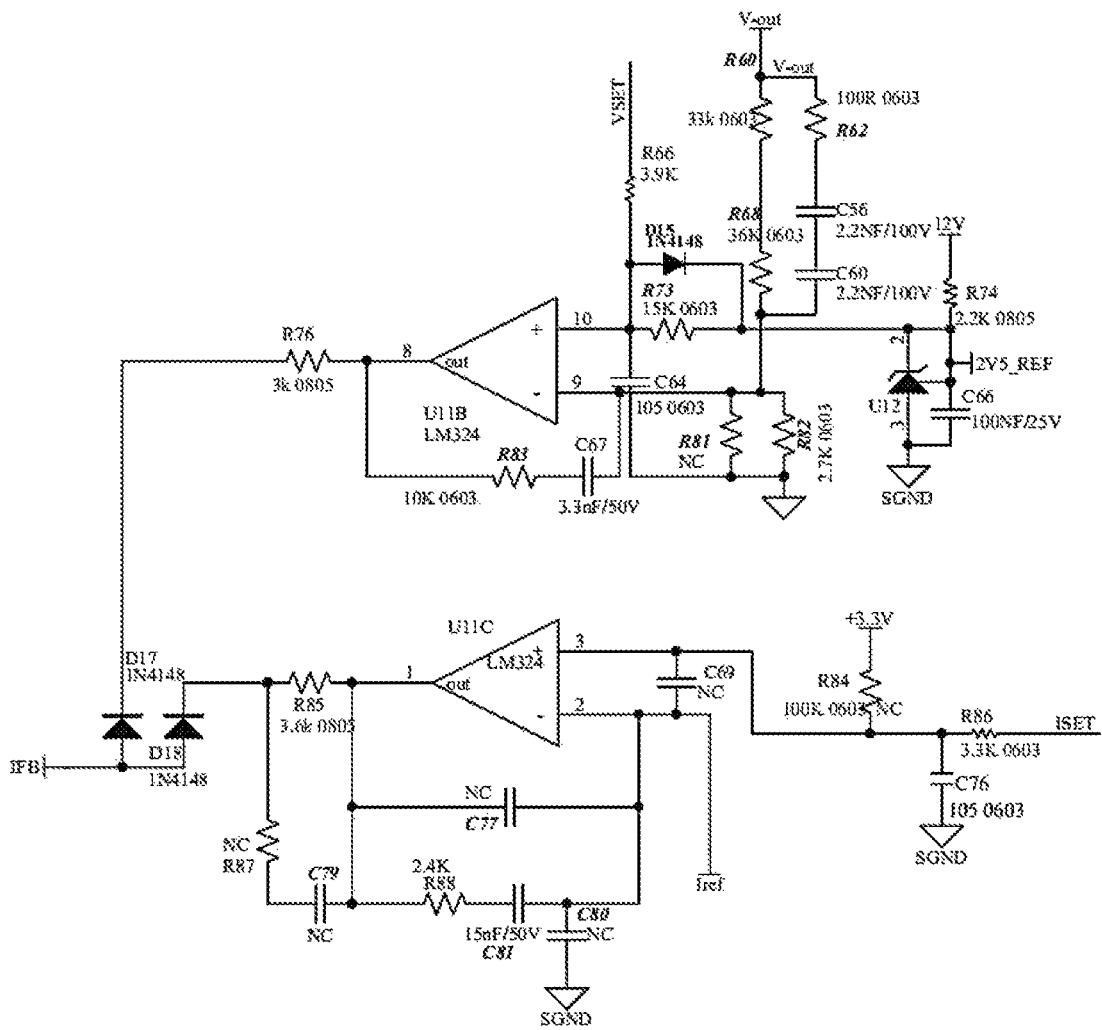
FIG. 7 is a circuit diagram of a feedback amplifier circuit according to an embodiment.

The voltage follower circuit refers to a circuit whose input potential is the same as the output potential, and it is a circuit that functions as voltage follower and isolation. For example, it can be a circuit composed of a resistor R107, a resistor R108, a capacitor C93, and a capacitor C94 as shown in FIG. 6. An input end Vpwm of the circuit is an input end of the voltage follower circuit, and an end Vset is an output end of the voltage follower circuit. When the charging is completed and the charging interface 50 is disconnected from the battery, the charge-enabled pin is disconnected firstly. At this time, the fourth end of the charging management circuit 60 outputs a low level. Under the function of the low level, the output end Vset of the voltage follower circuit also outputs a low level to an input end of the feedback amplifier circuit, for example, it can be the pin VSET of the feedback amplifier circuit as shown in FIG. 7, and a low level is input to the pin VSET. At this time, an output end IFB of the feedback amplifier circuit also outputs a low level signal to the light emitter of the first optical coupler. After the light receiver of the first optical coupler receives the light emitted by the light emitter, the level of pin BURST of the resonant half-bridge control circuit 21 is also pulled down to turn off the driving function of the resonant half-bridge control circuit 21. At this time, a primary side of the transformer T1 stops operating and no longer outputs electric energy to a secondary side thereof. The output current of the LLC half-bridge resonant power supply 20 quickly drops to zero. At this time, the connections between the engage-enabled pin and the port CON2 and the battery are disconnected respectively in order to achieve zero-current disconnecting operation. In this way, no arc is generated, and the pins of the charging device can be effectively protected from being oxidized due to the arc effect, so that the service life and safety of the charging device can be improved.

In an embodiment, as shown in FIG. 4, the first switch 30 is a relay, and the relay model in FIG. 4 can be used. As shown in FIG. 4, the above output control circuit 24 may include a first transistor. A base of the first transistor is connected to the third end of the charging management circuit 60, an emitter of the first transistor is grounded, and a collector of the first transistor is connected to a coil of the first switch 30. When the other end of the charge-enabled pin of the charging interface 50 is in contact with the battery 40 to be charged, the third end of the charging management circuit 60 outputs a high level to trigger the first transistor to be turned on. The collector of the first transistor triggers the coil to cause the first switch 30 to be turned on, and the LLC half-bridge resonant power supply 20 charges the battery 40 to be charged. In addition to the first transistor, the output control circuit 24 may further include a resistor R45, a resistor R50, a resistor R55, and a resistor R59 as shown in FIG. 4, and according to the connection relationship as shown in FIG. 4, they are connected to the third end relay_2 of the charging management circuit 60, and connected to the each corresponding end of the first transistor as shown in the figure.

In an embodiment, as shown in FIG. 4, the charging output circuit 25 may include a first filter circuit.

An input end of the first filter circuit is connected to the output end of the first switch 30. For example, as shown in FIG. 4, the first filter circuit includes a capacitor C20, a resistor R57 and a resistor R51. The voltage output from the output end of the first switch 30K2, after filtered by the first filter circuit, can be buffered by an inductor L3 and then reaches a fuse protection circuit. An input end of the fuse protection circuit is connected to an output end of the first filter circuit, and an output end of the fuse protection circuit is configured to be connected to the battery 40 to be charged. For example, as shown in FIG. 4, the fuse protection circuit may include a fuse FUSE1 and a fuse FUSE2 for overcurrent protection to avoid battery damage. In addition, the charging output circuit 25 further include a resistor R49, a resistor R60, a capacitor C30, a capacitor C28, a capacitor C21, a capacitor CY10, and a capacitor CY9 as shown in FIG. 4. Positive voltage B+ and negative voltage B− are supplied to the battery 40 to be charged through the connections as shown in FIG. 4, and the charging efficiency is improved.

Figure 8:
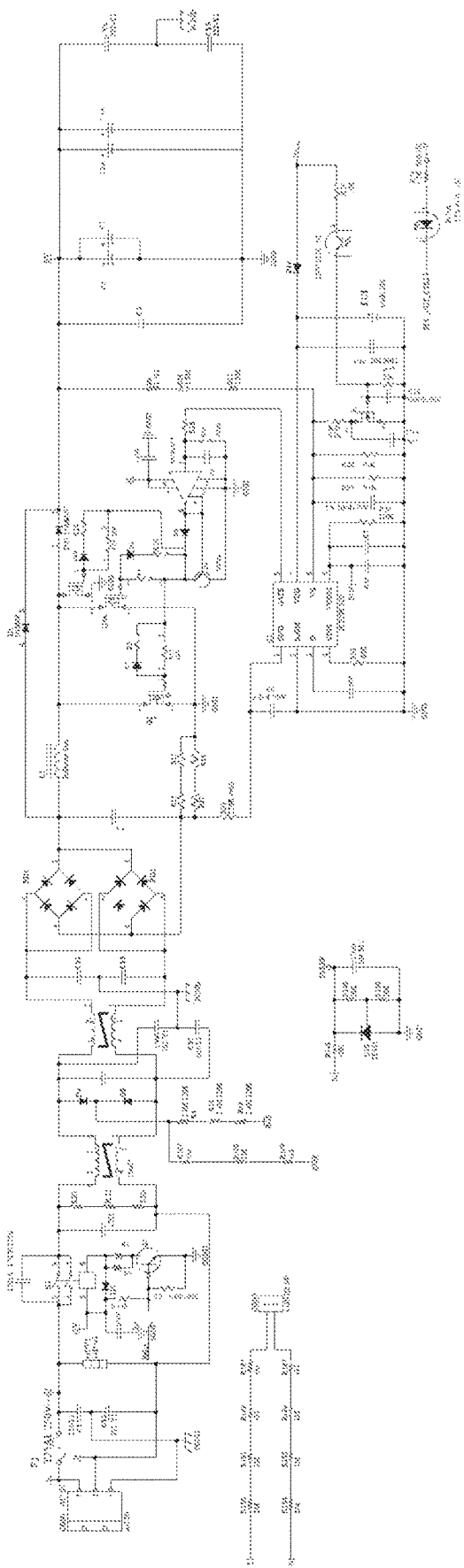
FIG. 8 is a circuit diagram of a power factor correction power supply and an input rectification filter circuit in a charging device according to an embodiment.

In an embodiment, as shown in FIG. 8, the charging device further includes a power factor correction power supply. An input end of the power factor correction power supply is configured to be connected to the power supply 10, and an output end of the power factor correction power supply is connected to the input end of the resonant half-bridge control circuit and the input end of the primary side resonant circuit. The output end of the power factor correction power supply can provide a voltage HV through a charging capacitor as shown in FIG. 8, which applies to the input end (the BO pin as shown in FIG. 3) of the primary side resonant half-bridge control circuit 21 (can be the chip HR1000A in the figure) of the LLC half-bridge resonant power supply 20 as shown in FIG. 3 and the input end of the primary side resonant circuit 22. For example, an output voltage HV of the power factor correction power supply is applied to a transistor Q1 as shown in FIG. 3 and applied to a transistor Q21 through a resonant capacitor C60 and a resonant capacitor C35, to provide the voltage support required for turning on and off of the transistor. Then the resonant half-bridge control circuit 21 controls the transistor Q1 and the transistor Q21 to be turned on and off when operating in power, so that the generation of the primary side voltage is achieved. The connection between the power factor correction power supply and the LLC half-bridge resonant power supply 20 can be connected in parallel with a filter circuit including a capacitor CY8, a capacitor CY4 and a capacitor CY8 as shown in FIG. 3. HV is grounded through a resistor R43, a resistor R52, a resistor R64 and a resistor R85 connected in series respectively. At the midpoint of the connection between of the resistor 64 and the resistor 81, a lead is led out, which is connected to a resistor R71 and then to the pin BO of HR1000A. At the midpoint of the connection between R71 and the pin BO, a lead is led out, which is connected in series to a capacitor C37 and then grounded.

Figure 9A:
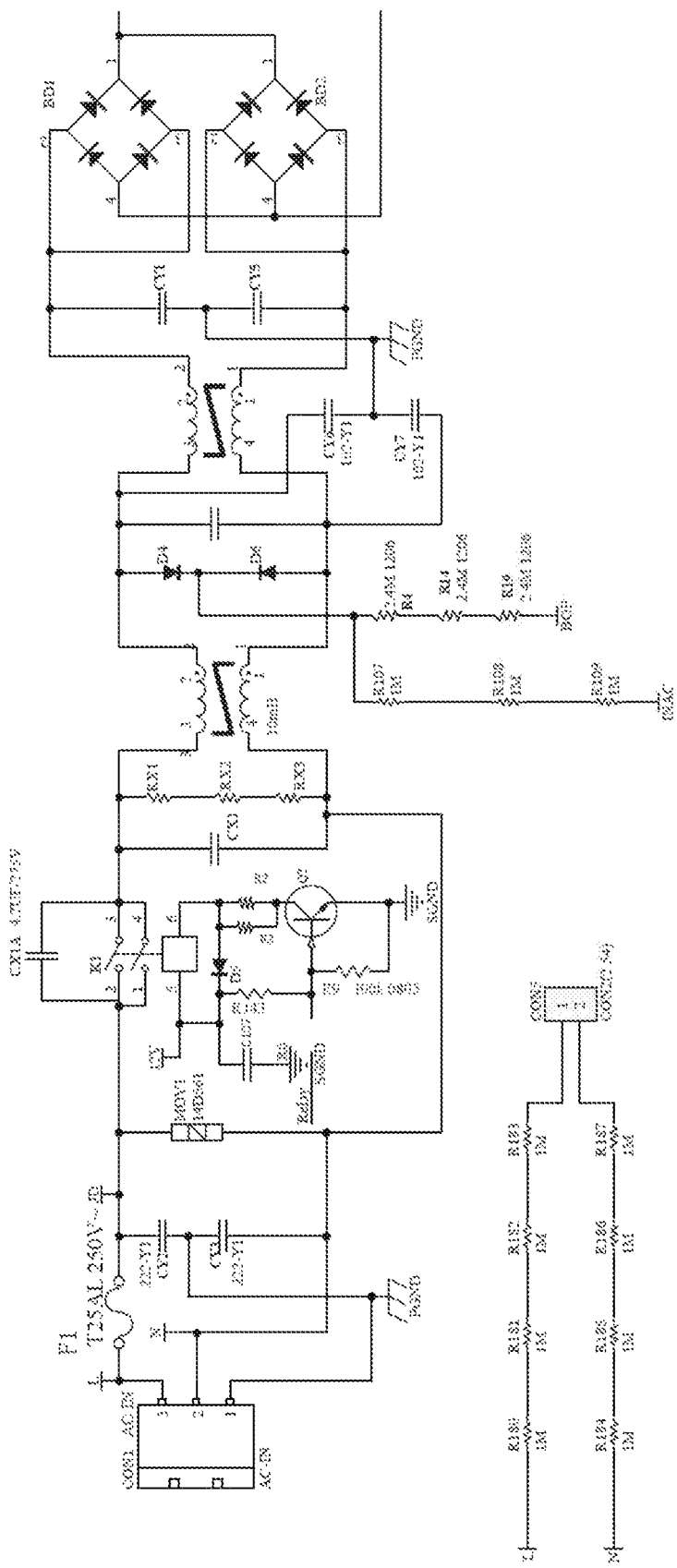
FIG. 9a is a circuit diagram of a part before a rectifier bridge in the circuit of FIG. 8.
Figure 9B:
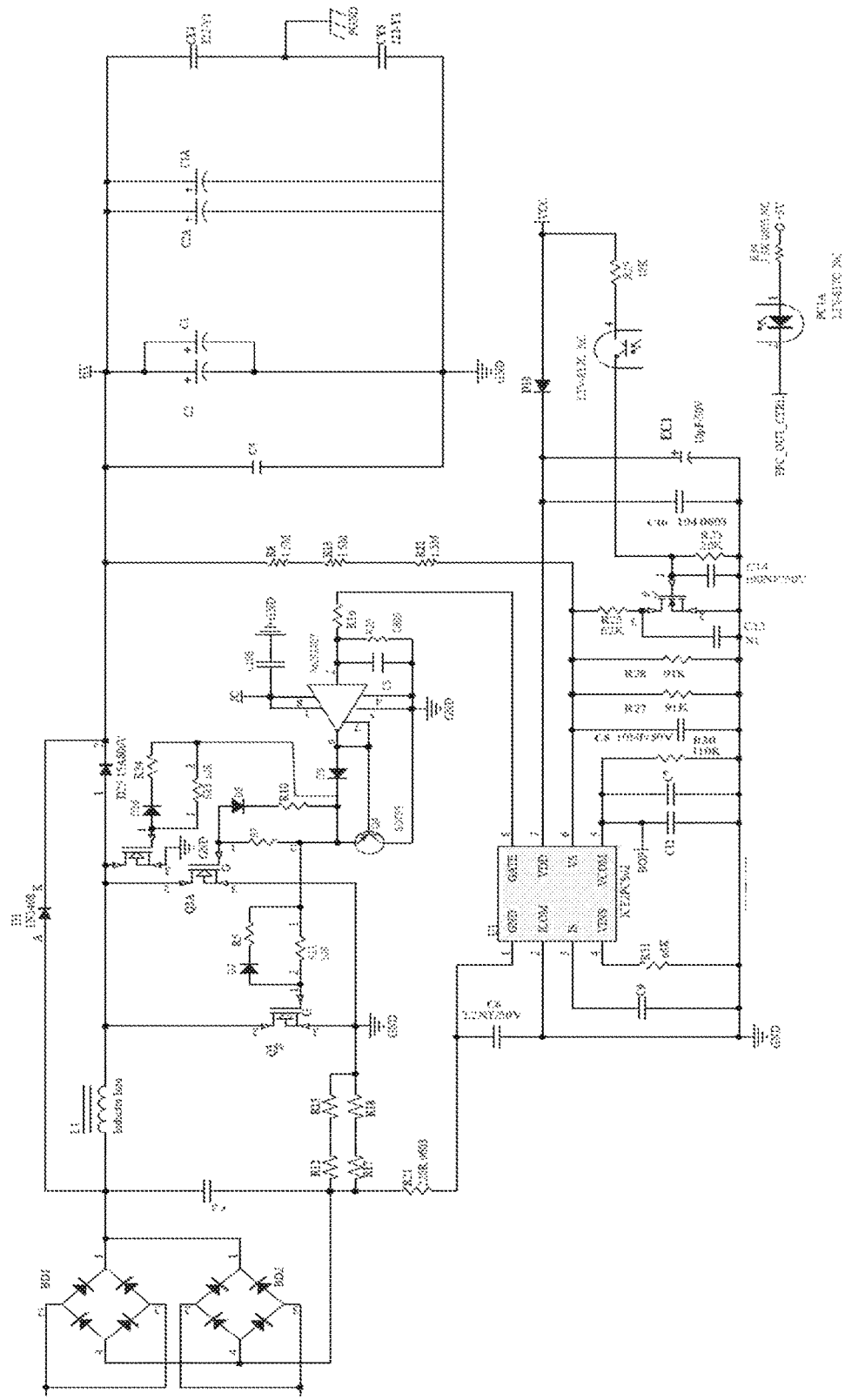
FIG. 9b is a circuit diagram of a part for the power factor correction power supply part after a rectifier bridge in the circuit of FIG. 8.

In an embodiment, as shown in FIG. 8, the charging device further includes an input rectification filter circuit connected in series between the power supply 10 and the power factor correction power supply (PFC). The voltage of the power supply 10 (such as a mains supply) is converted to DC power by the input rectification filter circuit, and then after passing through the power factor correction power supply, the HV voltage is generated and output to the LLC half-bridge resonant power supply 20 to achieve the charging control under soft start. The input rectification filter circuit may use a rectifier circuit including a rectifier bridge BD1 and BD2 as shown in FIG. 8, and may also include a circuit with a filter energy storage function including an inductor L1 and a capacitor C3, and may also include other parts as shown in FIG. 8. In order to more clearly show the preferred implementation of the input rectification filter circuit and the power factor correction power supply, reference can be made to the partial schematic diagrams in FIGS. 9a and 9b. The circuit structure and component model selection shown in the drawings of the embodiments of the present disclosure are all within the protection scope of the present disclosure, and those skilled in the art can reasonably understand the other beneficial effects of the charging device provided in the present disclosure according to the structure and component model selection shown in the drawings, which will not be repeated here.

In an embodiment, as shown in FIG. 8, the charging device further includes an input anti-interference protection circuit between the input rectification filter circuit and the power supply 10. The input anti-interference protection circuit may include a resistor group composed of a fuse F1 and R180 to R 187 as shown in FIG. 8. The resistor group is connected in parallel to the pin 3 and pin 2 of the port CON1 connected to the power supply through an L end and a N end as shown in FIG. 9, which plays a role of current limiting protection. The input anti-interference protection circuit may further include a LF1 common mode inductor to resist electro magnetic interference (EMI), so that the signal of the input end of the PFC power supply is more stable.

Figure 10:
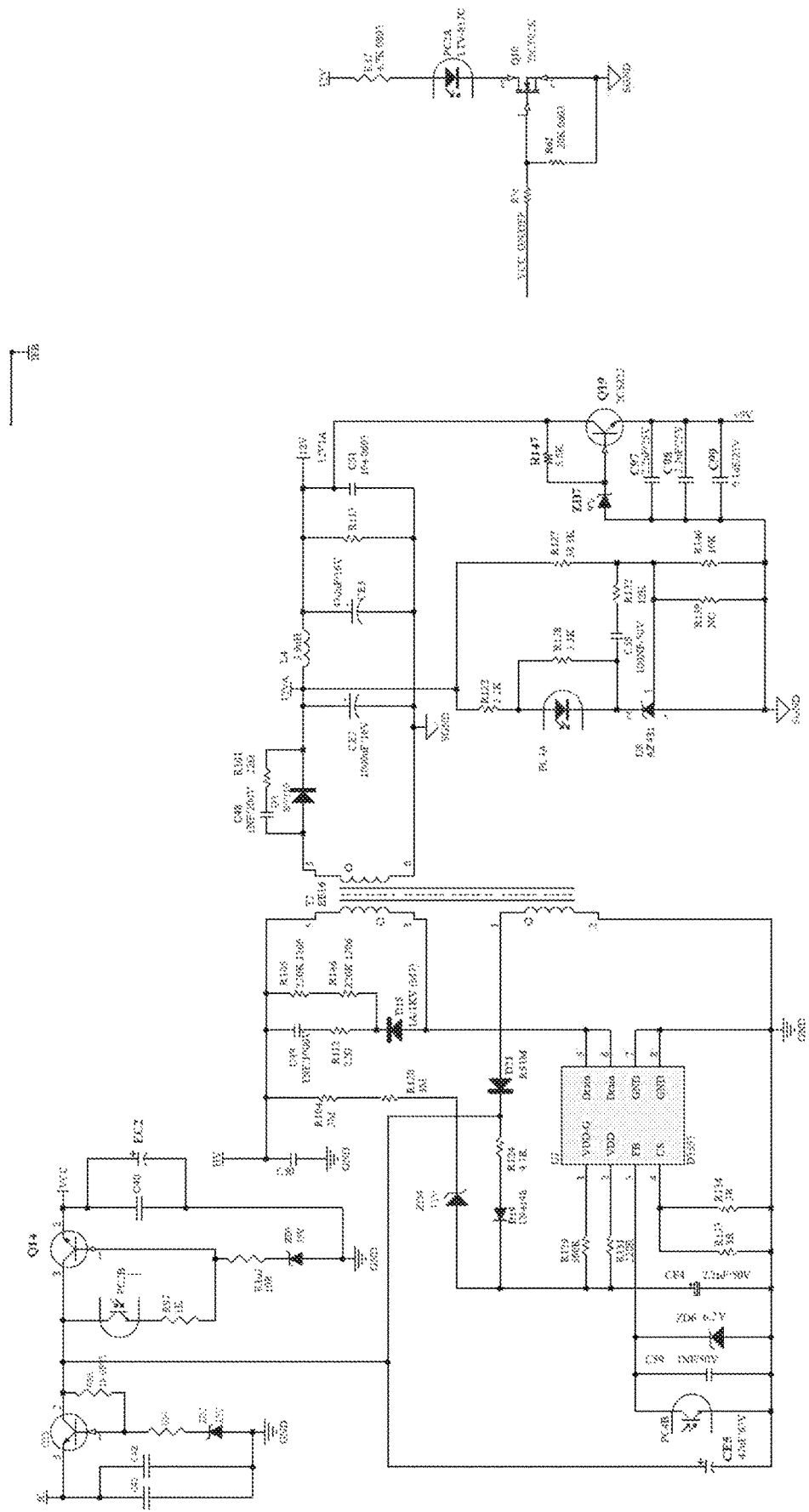
FIG. 10 is a circuit diagram of a logic device power supply conversion circuit according to an embodiment.

Considering the differences in the voltage required for the operation of each chip device, in an embodiment, as shown in FIG. 10, the charging device further includes a logic device power supply conversion circuit. An input end of the logic device power supply conversion circuit is configured to be connected to an output end of the power factor correction power supply. An output end of the logic device power supply conversion circuit is connected to the LLC half-bridge resonant power supply 20 and the charging management circuit 60, respectively, and configured to convert the output voltage of the power factor correction power supply to an operating voltage applicable for the LLC half-bridge resonant power supply 20 and the charging management circuit 60. A D3555 power management chip shown in FIG. 10 can be used to achieve that the HV voltage output by the power factor correction power supply is output as a voltage of 5VREF, 12VA, 12V, and +9V after managed by a power management chip U7, which refer to the operating voltage shown in the figures provided by each logic device in the FIGS. 3 to 9, to cause each device to operate normally. In addition, in the logic device power supply conversion circuit, a second optical coupler (a light emitter PC4A and a light receiver PC4B) as shown in FIG. 10 is also used to achieve output feedback, which is beneficial for U7 to adjust the output signal of Drain according to the feedback signal feedback by a feedback pin FB of U7, thereby providing a stable 12VA signal, and in turn providing a stable 12V and +9V voltage. Similarly, a third optical coupler (a light emitter PC2A and a light receiver PC2B) is also provided, which is triggered to operate by the 12V voltage generated and a switch control pin VCC_ON/OFF of the charging management circuit 60. When the light receiver PC2B receives the light emitted by the light emitter PC2A, a collector of a transistor Q14 is connected to the base thereof, and the resistor R97 plays a negative feedback function to stabilize Q point, so that the stability of the output voltage of the logic device power supply conversion circuit is improved.

The power factor correction power supply and the logic device power supply conversion circuit as shown in FIGS. 8 to 10 can be controlled by the charging management circuit 60 of STM32 series as shown in FIG. 5, and the corresponding connection relationship of each end can be referred to the pin identification in the figures, and an end with the same signal identification refers to the end required to be connected correspondingly.

According to the charging device provided by the embodiments of the present disclosure, by providing a charge-enabled pin and an engage-enabled pin with different lengths in the charging interface 50 of the charging device and using the charging management ability of the charging management circuit 60, the first end of the charging management circuit 60 is connected to an end of the engage-enabled pin, the second end of the charging management circuit 60 is connected to an end of the charge-enabled pin, and the third end of the charging management circuit 60 is connected to the controlled end of the first switch 30. When charging, since the charge-enabled pin is the shortest, the engage-enabled pin is firstly in contact with the battery. When the battery is in contact with the engage-enabled pin, the electrical signal received by the first end of the charging management circuit 60 connected to the other end of the engage-enabled pin is changed. When the charging management circuit 60 detects the change, it controls the LLC half-bridge resonant power supply 20 to soft start. During the soft start process of the LLC half-bridge resonant power supply 20, the charge-enabled pin contacts the battery later. The electrical signal received by the second end of the charging management circuit 60 connected to the other end of the charge-enabled pin is changed under the effect of the battery. The charging management circuit 60 detects the change, and the third end thereof outputs a signal, which applies to the controlled end of the first switch 30, to drive the first switch 30 to be turned on. At this time, the output end of the LLC half-bridge resonant power supply 20 charges the battery 40 to be charged to achieve charging soft start and zero-voltage connection.

When the charging process is completed, since the charge-enabled pin is the shortest, the charge-enabled pin is firstly removed from the battery 40 to be charged during the process of unplugging the charging interface 20. At this time, the charging management circuit 60 can detect the disconnection of the charge-enabled pin from the battery by the change of the signal received by the second end. At this time, the fourth end of the charging management circuit 60 outputs a signal to the burst mode operation threshold setting end of the LLC half-bridge resonant power supply 20 to trigger the primary side of the LLC half-bridge resonant power supply 20 to stop operating. At this time, the engage-enabled pin is further disconnected from the battery. Since the primary side of the LLC half-bridge resonant power supply 20 has stopped operating at this time, zero-current disconnection is achieved, thereby avoiding the oxidation problem of the contact surface caused by the arc generated during the hot plugging process, and improving the service life and safety of the charging device.

In the description of the present specification, the description of the reference terms "some embodiments", "other embodiments", "ideal embodiments" and the like means that the specific features, structures, materials or characteristics described in conjunction with the embodiments or examples are included in at least one embodiment or example of the present disclosure. In this specification, the schematic description of the above terms does not necessarily refer to the same embodiment or example.

The technical features of the above embodiments can be combined arbitrarily. In order to make the description concise, all possible combinations of the various technical features in the above embodiments are not described. However, as long as there is no contradiction in the combination of these technical features, they should be considered as the scope of this specification.

The above embodiments only express several embodiments of the present disclosure. The descriptions are more specific and detailed, but they should not be understood as limiting the scope of the disclosure. It should be pointed out that for those ordinary skilled in the art, without departing from the concept of the present disclosure, several modifications and improvements can also be made and these all fall within the protection scope of the present disclosure. Therefore, the protection scope of the present disclosure shall be subject to the appended claims.

What is claimed is:

1. A charging device, comprising:
   an LLC half-bridge resonant power supply, an input end of the LLC half-bridge resonant power supply being configured to be connected to a power supply, an output end of the LLC half-bridge resonant power supply being connected to an input end of a first switch in a normally open state, and an output end of the first switch being configured to be connected to a battery to be charged,
   a charging interface configured to be connected to the battery to be charged, and provided with an engage-enabled pin and a charge-enabled pin, the length of the charge-enabled pin being smaller than the length of a communication-enabled pin and the engage-enabled pin, respectively, and
   a charging management circuit, a first end of the charging management circuit being connected to an end of the engage-enabled pin, a second end of the charging management circuit being connected to an end of the charge-enabled pin, a third end of the charging management circuit being connected to a controlled end of the first switch, and a fourth end of the charging management circuit being connected to a burst mode operation threshold setting end of the LLC half-bridge resonant power supply;
   wherein the charging management circuit is configured to control the LLC half-bridge resonant power supply to soft start when the battery to be charged is in contact with the engage-enabled pin during a process of plugging the charging interface into the battery to be charged; the charging management circuit is further configured to control the first switch to be turned on when another end of the charge-enabled pin of the charging interface is in contact with the battery to be charged, to cause the LLC half-bridge resonant power supply to charge the battery to be charged; and
   the charging management circuit is configured to control a primary side of the LLC half-bridge resonant power supply to stop operating when the charge-enabled pin is disconnected from the battery to be charged during a process of unplugging the charging interface from the battery to be charged.

2. The charging device according to claim 1, wherein the LLC half-bridge resonant power supply comprises:
   a resonant half-bridge control circuit, an input end of the resonant half-bridge control circuit being configured to be connected to the power supply,
   a primary side resonant circuit, an input end of the primary side resonant circuit being configured to be connected to the power supply, and a controlled end of the primary side resonant circuit being connected to a control end of the resonant half-bridge control circuit,
   a secondary side rectifier circuit, an input end of the secondary side rectifier circuit being coupled to the primary side resonant circuit, an output end of the secondary side rectifier circuit being connected to the input end of the first switch,
   an output control circuit, a controlled end of the output control circuit being connected to the third end of the charging management circuit, and a control end of the output control circuit being connected to a control end of the first switch, and
   a charging output circuit, an end of the charging output circuit being connected to the output end of the first switch, and another end of the charging output circuit being configured to be connected to the battery to be charged.

3. The charging device according to claim 2, further comprising a first optical coupler, wherein:
   a light emitter of the first optical coupler is connected to the fourth end of the charging management circuit, and a light receiver of the first optical coupler is connected to the burst mode operation threshold setting end of the resonant half-bridge control circuit;
   the charging management circuit is configured to, during the process of unplugging the charging interface from the battery to be charged, when the charge-enabled pin is disconnected from the battery to be charged, output a signal from the fourth end of the charging management circuit to make the light emitter operate, causing the light receiver of the first optical coupler to pull potential at the burst mode operation threshold setting end to a low level when receiving a light signal emitted by the light emitter; and
   when the burst mode operation threshold setting end is at a low level, the resonant half-bridge control circuit enters an idle state to cause the primary side resonant circuit to stop operating.

4. The charging device according to claim 3, wherein the resonant half-bridge control circuit is an HR1000 model controller.

5. The charging device according to claim 3, further comprising:
   a voltage follower circuit, an input end of the voltage follower circuit being connected to the fourth end of the charging management circuit, and potential at an output end of the voltage follower circuit being the same as potential to which the input end of the voltage follower circuit is applied; and
   a feedback amplifier circuit, an input end of the feedback amplifier circuit being connected to the input end of the voltage follower circuit, and an output end of the feedback amplifier circuit being connected to the light emitter of the first optical coupler.

6. The charging device according to claim 2, wherein the first switch is a relay, and the output control circuit comprises a first transistor;
   wherein a base of the first transistor is connected to the third end of the charging management circuit, an emitter of the first transistor is grounded, and a collector of the first transistor is connected to a coil of the first switch;
   the third end of the charging management circuit outputs high level to trigger the first transistor to be turned on when the other end of the charge-enabled pin of the charging interface is in contact with the battery to be charged; and the collector of the first transistor triggers the coil of the first switch to cause the first switch to be turned on, and the LLC half-bridge resonant power supply charges the battery to be charged.

7. The charging device according to claim 2, wherein the charging output circuit comprises;
   a first filter circuit, an input end of the first filter circuit being connected to the output end of the first switch, and
   a fuse protection circuit, an input end of the fuse protection circuit being connected to an output end of the first filter circuit, and an output end of the fuse protection circuit being configured to be connected to the battery to be charged.

8. The charging device according to claim 2, further comprising a power factor correction power supply; wherein:
   an input end of the power factor correction power supply is configured to be connected to the power supply, and an output end of the power factor correction power supply is connected to the input end of the resonant half-bridge control circuit and the input end of the primary side resonant circuit.

9. The charging device according to claim 8, further comprising:
   an input rectification filter circuit, connected in series between the power supply and the power factor correction power supply.

10. The charging device according to claim 8, further comprising a logic device power supply conversion circuit; wherein:
    an input end of the logic device power supply conversion circuit is configured to be connected to the output end of the power factor correction power supply; and an output end of the logic device power supply conversion circuit is connected to the LLC half-bridge resonant power supply and the charging management circuit, respectively, and configured to convert the output voltage of the power factor correction power supply to an operating voltage applicable for the LLC half-bridge resonant power supply and the charging management circuit.

* * * * *